Oct. 15, 1929.  R. F. BACON  1,731,516
RECOVERY OF SULPHUR FROM IRON PYRITES
Filed April 13, 1927
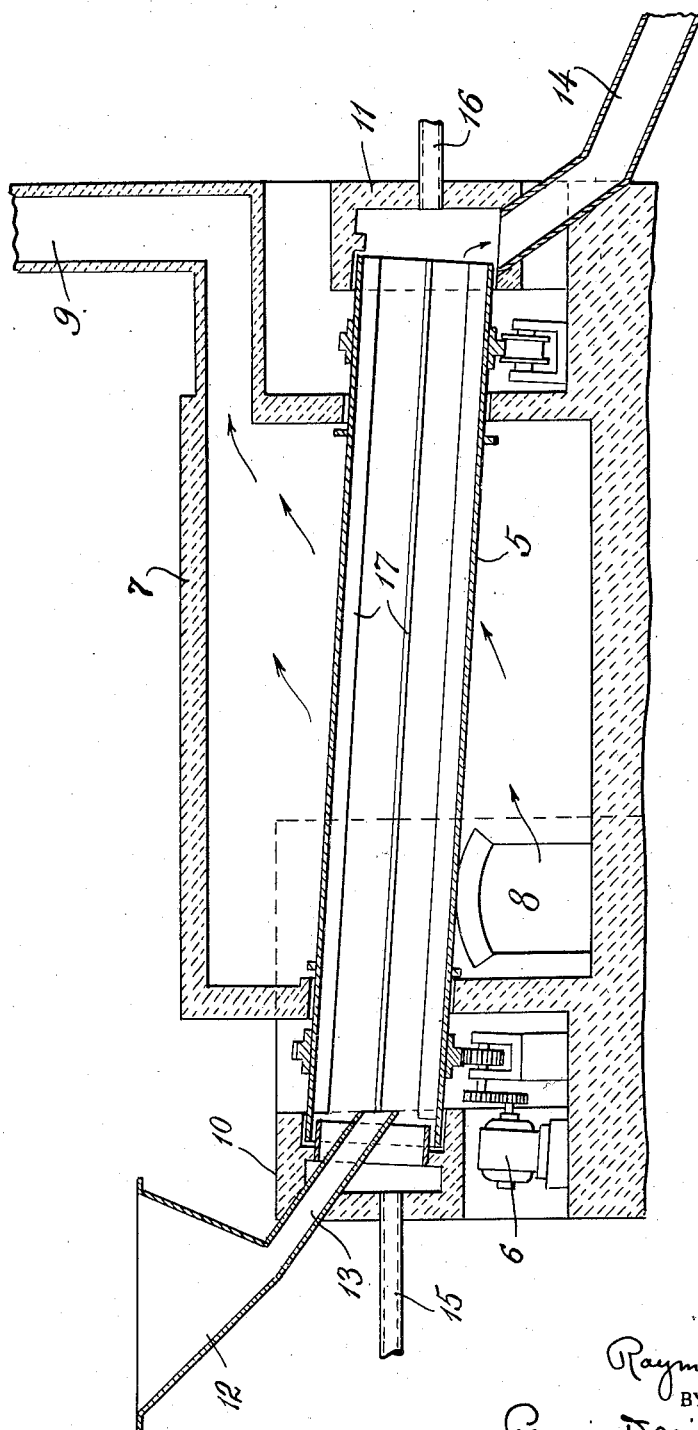
INVENTOR
Raymond F. Bacon
BY
Pennie, Davis, Marvin & Edmonds
ATTORNEYS Patented Oct. 15, 1929

1,731,516

UNITED STATES PATENT OFFICE

RAYMOND F. BACON, OF BRONXVILLE, NEW YORK

RECOVERY OF SULPHUR FROM IRON PYRITES

Application filed April 13, 1927. Serial No. 183,435.

This invention relates to the recovery of sulphur from iron pyrites, and has for its object the provision of an improved method of recovering sulphur in elemental form from iron pyrites. More particularly, the invention aims to provide an improved method of recovering elemental sulphur from iron pyrites by the action of steam or water vapor.

It is known that if iron pyrites be treated with steam at high temperatures most of the sulphur will be removed from the pyrites. The actual chemical reactions taking place are complicated, but the net result is that the sulphur in the pyrites is largely converted into elemental sulphur, while some smaller amount is converted into hydrogen sulfide. For the complete elimination of the sulphur, very large amounts of steam and relatively high temperatures are required. So far as I am aware, this process has not been commercially used, probably because the large amounts of steam and high temperatures required for effecting substantially complete removal of the sulphur necessitate the use of an uneconomical amount of fuel.

I have discovered that the reaction between iron pyrites and steam can be substantially promoted by mixing a relatively small amount of an alkali or alkaline agent with the pyrites. Thus, I have found that in the presence of the alkali or alkaline agent the reaction between the pyrites and steam proceeds much more rapidly and with less steam and at a lower temperature. The action of the alkali or alkaline agent appears to be partially catalytic, and partially chemical, since in addition to promoting the reaction, it very substantially increases the hydrogen sulfide content of the resulting gaseous product. In fact, when a sufficient amount of the alkali is present, a very considerable proportion of the total sulphur eliminated from the pyrites appears in the resulting gaseous product in the form of hydrogen sulfide.

My present invention is based on the foregoing discoveries and involves subjecting iron pyrites to the action of steam in the presence of an alkali or alkaline agent and thereby forming a gaseous product containing the sulphur eliminated from the pyrites largely in the form of hydrogen sulfide. In accordance with my preferred practice, this gaseous product is treated with sulphur dioxide whereupon elemental sulphur is produced and may be collected in any appropriate manner.

In carrying out the invention, the iron pyrites is mixed with a suitable amount of an alkali or alkaline agent. Various alkalis and alkaline agents are suitable for the purpose, among which may be mentioned sodium carbonate, sodium hydroxide, and the oxide, hydroxide and carbonate of either barium or calcium. Lime may be used with advantage, more particularly where the residual iron cinder is to be smelted. Very satisfactory results are obtained by the use of lime in amounts substantially less than the theoretical amount necessary to combine with all the sulphur in the pyrites to form calcium sulfide.

In the treatment of siliceous iron pyrites, where the residual iron cinder is to be smelted, I prefer to use lime in amount sufficient to flux the siliceous content of the residual iron cinder. By so doing, the residual iron cinder, remaining after the elimination or removal of the sulphur from the iron pyrites, will be substantially self-fluxing, as regards its lime and silica content, for blast furnace practice.

The mixed iron pyrites and alkali are subjected to the action of steam under any appropriate conditions. I prefer to carry out the operation in a retort heated to a temperature of about 400 to 800° C. The chemical reactions taking place are complicated, but the net result is that substantially all of the sulphur is removed from the pyrites, and a very considerable portion of the sulphur appears in the resulting gaseous product of the reaction in the form of hydrogen sulfide. It seems probable that the alkali acts primarily as a catalyst, and that in addition the metal of the alkali reacts with the elemental sulphur liberated from the pyrites by the action of the steam, or perhaps reacts directly with the pyrites, to form a sulfide, and that this sulfide is then decomposed by steam reforming the alkali and producing hydrogen sulfide.

The gaseous product of the reaction is preferably treated with sulphur dioxide which reacts with the hydrogen sulfide with the formation of elemental sulphur. Thus, the gaseous product may be conducted to an appropriate condensing apparatus and there subjected to the action of sulphur dioxide. Whatever elemental sulphur was present in the gaseous product will be condensed together with the elemental sulphur formed by the reaction between the hydrogen sulfide and sulphur dioxide. If desired, the hydrogen sulfide in the gaseous product may be converted into elemental sulphur in any other appropriate manner, as for example by the Claus process.

While the invention is of especial advantage in the treatment of iron pyrites, it is also applicable to the recovery of sulphur from other iron and other metal sulfides. Thus natural iron sulfides of the type of pyrrhotite, and zinc blende, and the like, may be employed in the practice of the invention. The invention is thus applicable to any metal sulfide whose sulphur content can be in whole or in part removed by reaction with steam at elevated temperatures. Throughout this specification and the appended claims, I have used iron pyrites as typical and representative of such metal sulfides, and with the intention of including and covering all such metal sulfides, as well as ores, concentrates or other products containing the same.

Various forms of apparatus are available for the practice of the invention. In the single figure of the accompanying drawing, I have illustrated an apparatus satisfactory for the purpose.

The apparatus illustrated in the drawing comprises an inclined cylindrical retort 5 rotatably mounted and operatively connected to a driving motor 6. The retort may be made of any appropriate material adapted to withstand such corrosive influences as result from the reactions taking place between the pyrites and steam. Iron-nickel-chromium alloys are suitable for the purpose.

The retort is enclosed for the greater part of its length in a furnace structure 7, having an opening 8 communicating with a grate or fire box (not shown) and a stack 9. The upper or charging end of the retort extends into a stationary housing 10, and the lower or discharging end of the retort extends into a similar housing 11. A feeding hopper 12 and cooperating spout 13 is associated with the housing 10 and is adapted to feed the pyrites into the revolving retort. A residue discharge spout 14 is associated with the housing 11 and is adapted to remove the residues discharging from the retort. Appropriate sealing agencies may be provided in conjunction with the housings and associated spouts.

Steam is introduced into the retort 5 from a supply pipe 15. The gaseous products of the reaction between the pyrites and the steam are withdrawn from the retort 5 through an outlet pipe 16 communicating with an appropriate condensing apparatus. Preferably, the steam is recirculated through the retort and condensing apparatus without condensation to water as described in my copending patent application, Serial No. 181,459; filed Apr. 6, 1927.

The operation of the apparatus will be understood from the foregoing description. The retort 5 is preferably provided with longitudinal blades 17 which in the rotation of the retort pick up the pyrites and shower the same through the atmosphere of steam filling the retort, thereby securing intimate contact between the pyrites and the steam. The mixed pyrites and alkali are fed into the retort from the hopper 12 through the spout 13. In the retort the pyrites are subjected to the action of steam in the presence of the alkali at a temperature of about 400–800° C. The gaseous products of the reaction are withdrawn through the outlet pipe 16 and subjected to appropriate treatment for the recovery of elemental sulphur. The operation is substantially continuous, and in my preferred practice the steam circulates through the system in a cyclic manner with little or no condensation to water.

I claim:

1. The method of recovering sulphur from iron pyrites which comprises subjecting the heated iron pyrites to the action of steam in the presence of an alkaline agent.

2. The method of recovering sulphur from iron pyrites which comprises subjecting the iron pyrites at an elevated temperature to the action of steam in the presence of an alkaline agent and thereby forming a gaseous product containing hydrogen sulfide, and treating the hydrogen sulfide so formed with sulphur dioxide and thereby producing elemental sulphur.

3. The method of recovering sulphur from iron pyrites, which comprises subjecting the iron pyrites at a temperature of about 400 to 800° C. to the action of steam in the presence of an active alkali.

4. The method of recovering sulphur from iron pyrites which comprises subjecting the iron pyrites at a temperature of about 400 to 800° C. to the action of steam in the presence of an alkali and thereby forming a gaseous product containing the sulphur eliminated from the pyrites in the form of hydrogen sulfide, and treating the hydrogen sulfide so formed with sulphur dioxide and thereby producing elemental sulphur.

5. The method of recovering sulphur from iron pyrites which comprises subjecting the iron pyrites at an elevated temperature to the action of steam in the presence of lime.

6. The method of recovering sulphur from siliceous iron pyrites which comprises subjecting the iron pyrites at an elevated temperature to the action of steam in the presence of lime in amount sufficient to flux the siliceous content of the residual iron cinder in a subsequent smelting operation.

7. The method of recovering sulphur from iron pyrites which comprises subjecting the iron pyrites at a temperature of about 400 to 800° C. to the action of steam in the presence of lime, and thereby forming a gaseous product containing the sulphur eliminated from the pyrites largely in the form of hydrogen sulfide, and treating the hydrogen sulfide so formed with sulphur dioxide and thereby producing elemental sulphur.

8. The method of recovering sulphur from siliceous iron pyrites which comprises subjecting the iron pyrites at a temperature of about 400 to 800° C. to the action of steam in the presence of lime in amount sufficient to flux the siliceous content of the iron cinder in a subsequent smelting operation and thereby forming a gaseous product containing the sulphur eliminated from the pyrites largely in the form of hydrogen sulfide, and treating the hydrogen sulfide so formed with sulphur dioxide and thereby producing elemental sulphur.

In testimony whereof I affix my signature.

RAYMOND F. BACON.